UNITED STATES PATENT OFFICE.

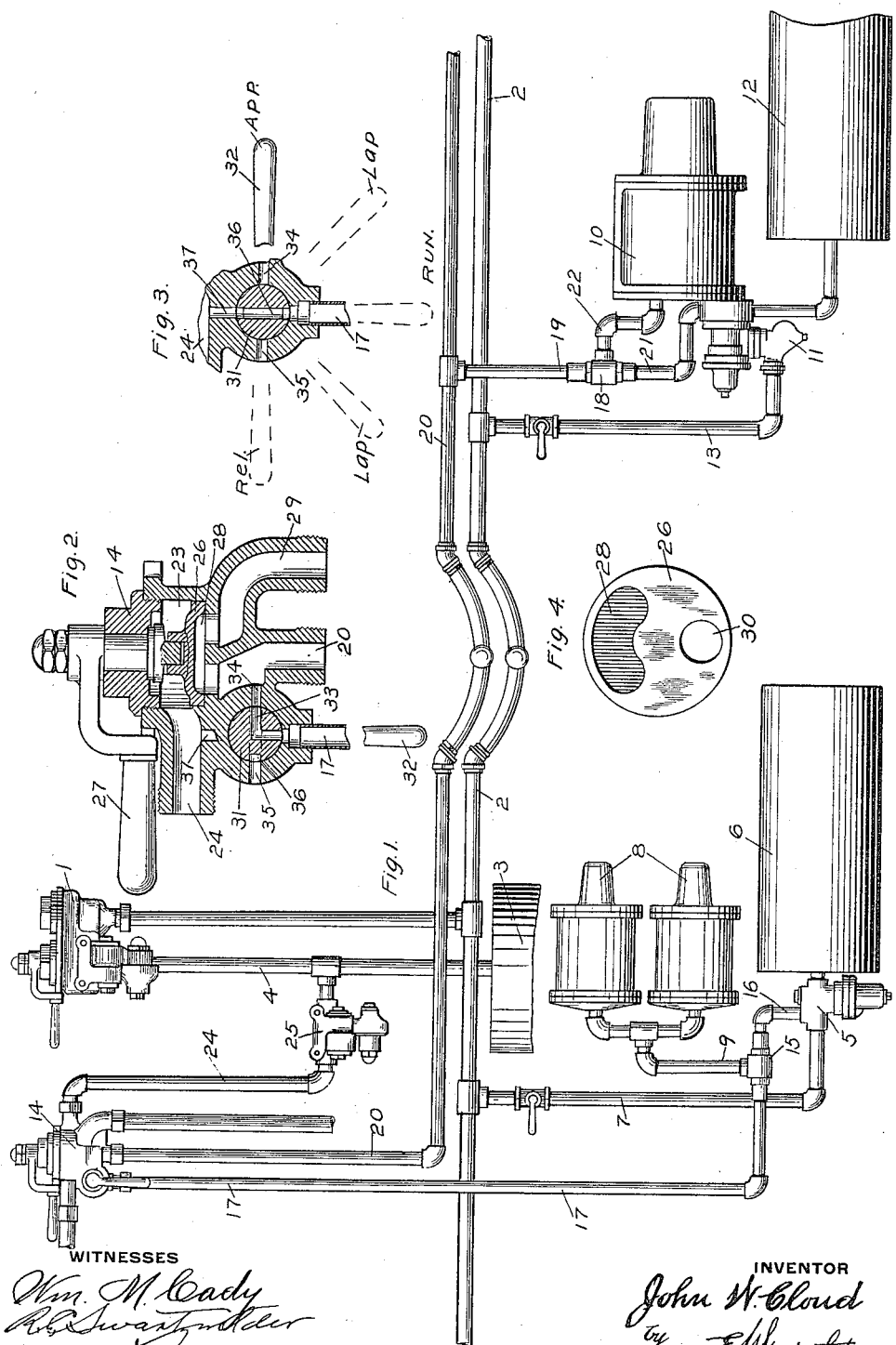

JOHN W. CLOUD, OF LONDON, ENGLAND, ASSIGNOR TO THE WESTINGHOUSE AIR BRAKE COMPANY, OF PITTSBURGH, PENNSYLVANIA, A CORPORATION OF PENNSYLVANIA.

COMBINED AUTOMATIC AND STRAIGHT-AIR BRAKE.

1,075,549.

Specification of Letters Patent.   Patented Oct. 14, 1913.

Application filed May 24, 1910.   Serial No. 563,053.

*To all whom it may concern:*

Be it known that I, JOHN W. CLOUD, a citizen of the United States, and a resident of London, England, have invented a certain new and useful Improvement in Combined Automatic and Straight-Air Brakes, of which the following is a specification.

This invention relates to fluid pressure brakes, and more particularly to a combined automatic and straight air brake apparatus.

It is often desirable to operate the engine brakes independently of the train brakes at one time and simultaneously with the train brakes at another time and the principal object of my invention is to provide an improved apparatus for securing the above results.

In the accompanying drawing; Figure 1 is a diagrammatc view of a combined automatic and straight air brake equipment embodying one form of my improvement; Fig. 2 a sectional view of the independent brake valve employed in connection with the above apparatus; Fig. 3 a sectional view of the engine controlling cock in the position for supplying straight air to the engine brake cylinders; and Fig. 4 a face view of the rotary valve of the independent brake valve.

The equipment may comprise the usual automatic apparatus including, on the engine, an engineer's brake valve 1 having connection with the automatic train pipe 2 and with the main reservoir 3 through pipe 4, triple valve device 5, connected to auxiliary reservoir 6, and to the train pipe 2 by a branch pipe 7, and driver brake cylinders 8 having a pipe 9 leading thereto and also to the truck brake cylinder, if one is employed. Similarly, on the tender a brake cylinder 10 is provided, a triple valve device 11, connected to the train pipe 2 by pipe 13, and an auxiliary reservoir 12. In addition to the above mentioned automatic apparatus an independent or straight air brake valve 14 is provided on the engine, having a pipe 17 leading to one side of a double check valve 15 of any desired construction, the opposite side of the double check valve 15 being connected to pipe 16 leading to the triple valve device 5. The double check valve controls communication from the pipe 17 and from the triple valve pipe 16 to the pipe 9 leading to the engine brake cylinders.

On the tender, a double check valve 18 is preferably provided and this check valve is connected on one side to a branch pipe 19 leading to the straight air or independent train pipe 20 and on the opposite side to the triple valve pipe 21, a pipe 22 connecting the double check valve 18 to the tender brake cylinder 10. The straight air train pipe 20 leads from the independent brake valve 14 and extends through the train, and on the cars is preferably connected to the exhaust ports of the triple valves.

The straight air or independent brake valve 14 preferably comprises a casing having a valve chamber 23 connected to pipe 24 through which air is supplied from the main reservoir pipe 4, a reducing valve 25 being interposed in the pipe 24, so as to limit the pressure supplied to the brake valve. In the valve chamber 23 is a rotary valve 26 adapted to be operated by a handle 27. The valve 26 is provided with a cavity 28 for connecting the straight air pipe 20 with exhaust port 29 in one position, and a through port 30 for supplying fluid to said straight air pipe in another position. Preferably incorporated in the independent brake valve is a cock 31 having an operating handle 32 and provided with a passage 33 adapted in one position of the cock to connect a port 34 opening into the straight air pipe 20 with pipe 17 to the engine brake cylinders, and in another position to connect the pipe 17 with an exhaust port 35. The cock 31 is also provided with a through port 36 so inclined as to register in one position of the cock at one end with the pipe 17 and at the other end with a port 37 opening into the supply pipe 24.

In operation, the brakes may be controlled automatically throughout the train by the usual manipulation of the engineer's brake valve 1 to vary the train pipe pressure. If it is desired to apply the brakes by straight air, on the engine, tender and cars, the engineer's brake valve 1 being in running position, the straight air brake valve 14 is turned to the position in which the through port 30 registers with the port opening to pipe 20, the cock 31 being in the position shown in Fig. 2, with the port 33 connecting port 34 to the pipe 17, so that fluid under pressure is supplied to the engine brake cylinders through pipe 17, shifting the double check valve 15 so as to open communication from the pipe 17 to the pipe 9, and air is also supplied to the straight air train pipe 20, whence it flows through the double check valve 18 on the tender to the pipe 22 and the tender brake cylinder 10. On the cars the straight air pipe is connected to the triple valve exhaust, so that air is supplied to the brake cylinders on the cars through the triple valve. The brakes may be released with straight air by turning the handle 27 to the position in which the cavity 28 in the rotary valve 26 connects the straight air pipe 20 with exhaust port 29, either completely releasing by leaving the handle 27 in this position, or gradually, by turning the handle back and forth, as desired, between release and lap positions.

The train brakes may be released while holding the engine brakes applied after a straight air application by first turning the cock 31 to lap position, in which all the ports are blanked and then turning the brake valve handle 27 to release position, when the tender and train brakes only are released, as will be evident. The engine brakes may subsequently be released by turning the cock 31 to release position, in which the port 33 connects pipe 17 with the exhaust port 35.

To release the train brakes while holding the engine brakes applied, after an automatic application, the straight air brake valve being in running position, as shown in Fig. 2, the cock 31 is first turned to application position, in which the port 36 connects the supply pipe 24 with the engine pipe 17, so that fluid under pressure is admitted to the pipe 17 and thereby the double check valve 15 is shifted to cut off the automatic pipe 16 from the engine brake cylinders 8, then the cock 31 is turned to lap position between application and running position. The engineer's brake valve 1 is now turned to release position and the tender and train brakes are released in the usual manner, while the engine brakes are held applied by fluid from the main reservoir in the pipe 17. The engine brakes may subsequently be released by turning the cock 31 to running position, so that fluid from the engine brake cylinders may escape through port 33, to passage 20 and thence through cavity 28 in the rotary valve 26 to exhaust port 29.

If the brakes are applied automatically and it is desired to release the engine brakes and hold the train brakes applied, the cock 31 and the straight air brake valve 14 being in running position, the cock 31 is first turned to one of its lap positions and then the straight air brake valve is turned to lap position in which the connection is closed from the straight air pipe 20 both to the exhaust port 29 and the supply port 30. The engineer's brake valve 1 is now turned to release position and the engine brakes are released in the usual manner by the movement of the engine triple valve to release position. The triple valves on the cars are also moved to release position, but as the straight air pipe 20 connected to the exhaust ports of the triple valves is now closed, air cannot escape from the brake cylinders on the cars. In the case of the tender, the brakes are at first released when the engineer's brake valve is turned to release position, but are immediately reapplied by the fluid from the car brake cylinders flowing through the straight air pipe 20, the double check valve 18 on the tender being thereby shifted, so that fluid from the straight air pipe enters the pipe 22 and the brake cylinder 10. If the brakes have been applied by straight air, it is only necessary to turn the cock 31 to its release position in order to release the engine brakes without effecting the other brakes.

The train brakes may be applied independently of the engine brakes by first turning the cock 31 to one of its lap positions and then turning the straight air brake valve to cut off the straight air pipe 20 from the atmosphere and connect the same with the supply port 30. Fluid is then supplied through the straight air pipe and the exhaust ports of the triple valves to the brake cylinders on the cars, while the engine brakes remain released. On the tender, the double check valve 18 is shifted by fluid in the straight air pipe 20, so as to open communication to the pipe 22 and thus permit flow of air to the tender brake cylinder 10. If it is desired to apply the engine brakes without applying the train brakes, the cock 31 is turned to application position, in which fluid from pipe 24 is admitted through port 36 to the pipe 17 and thence flows to the engine brake cylinders.

It will be noted that all of the above described braking operations may be performed without interfering in any way with the automatic system, no matter in what position the independent brake valve or the cock 31 happens to be in, whether placed there purposely or inadvertently.

When the engine and tender are operated alone, the straight air pipe 20 should be closed by a dummy coupling on the back of the tender and it is not necessary in this case to charge the automatic system, as the engine and tender brakes may be operated by straight air, or the engine brakes may be operated independently by manipulation of the cock 31.

Having now described my invention, what I claim as new and desire to secure by Letters Patent, is:

1. In a fluid pressure brake, the combination with an automatic brake equipment for the engine and tender, of an independent brake valve for controlling the tender brake and a cock for independently controlling the engine brake.

2. In a fluid pressure brake, the combination with an automatic brake apparatus for the engine and for the tender, of an independent brake valve for controlling the tender brake and a cock for independently controlling the engine brake and having a position for connecting up the engine brake to be operated with the tender brake by manipulation of the independent brake valve.

3. In a fluid pressure brake, the combination with an automatic brake system on the engine and tender and an engineer's brake valve for controlling the automatic brakes, of an independent brake valve for controlling the brakes on the engine and tender and a cock for independently controlling the engine brakes and having a position adapted to connect the engine brake for simultaneous operation with the tender brake upon manipulation of the independent brake valve.

4. In a fluid pressure brake, the combination with a train pipe and a brake equipment on the engine, tender, and cars operating upon a reduction in train pipe pressure to apply the brakes, of a straight air pipe and a brake valve adapted to control the pressure in the straight air pipe to apply the brakes on the train and a cock for independently controlling the brakes on the engine.

5. In a fluid pressure brake, the combination with an automatic brake equipment on the engine and an automatic brake equipment on the tender, of a straight air pipe connected to the tender brake cylinder, a brake valve for controlling the pressure in said straight air pipe, an independent pipe connected to the engine brake cylinders and a cock for controlling the pressure in said independent pipe.

6. In a fluid pressure brake, the combination with an automatic brake equipment on the engine and an automatic brake equipment on the tender, of a straight air pipe connected to the tender brake cylinder, a brake valve having means for connecting the straight air pipe to a source of fluid pressure in one position and to an exhaust port in another position, an independent pipe connected to the engine brake cylinders, and a cock having means for connecting the independent pipe to a source of fluid pressure in one position and to an exhaust port in another position.

7. In a fluid pressure brake, the combination with an automatic brake equipment on the engine and an automatic brake equipment on the tender, of a straight air pipe connected to the tender brake cylinder, a brake valve having means for connecting the straight air pipe to a source of fluid pressure in one position and to an exhaust port in another position, an independent pipe connected to the engine brake cylinders, and a cock having means for connecting the independent pipe to a source of fluid pressure in one position and to an exhaust port in another position, and having still another position for connecting the straight air pipe to said independent pipe.

8. In a fluid pressure brake, the combination with an automatic brake equipment on the engine, tender, and cars, of a straight air pipe connected to the tender brake cylinder, a brake valve having means for connecting said straight air pipe to a source of fluid pressure in one position and to an exhaust port in another position, an independent pipe connected to the engine brake cylinders, and a cock having means for connecting said independent pipe to a source of fluid pressure in one position, to an exhaust port in another position, and to said straight air pipe in another position.

In testimony whereof I have hereunto set my hand.

JOHN W. CLOUD.

Witnesses:
Wm. M. Cady,
A. M. Clements.

Copies of this patent may be obtained for five cents each, by addressing the "Commissioner of Patents, Washington, D. C."